United States Patent
Wright et al.

[11] 3,778,986
[45] Dec. 18, 1973

[54] GRASS CATCHER BAG AND MOWER ASSEMBLY

[75] Inventors: Bruce C. Wright, Kansasville; Donald G. Erickson, Racine, both of Wis.

[73] Assignee: Jacobsen Manufacturing Company, Racine, Wis.

[22] Filed: June 8, 1972

[21] Appl. No.: 260,917

[52] U.S. Cl................................. 56/202, 56/320.2
[51] Int. Cl............................................. A01d 35/26
[58] Field of Search................... 56/202, 320.2, 17.4

[56] References Cited
UNITED STATES PATENTS

| 3,423,918 | 1/1969 | Siwek | 56/202 |
| 3,706,190 | 12/1972 | Taub | 56/202 |
| 2,973,614 | 3/1961 | Horner et al. | 56/202 X |
| 3,192,692 | 7/1965 | Slemmous | 56/202 X |
| 3,230,696 | 1/1966 | Liljenberg | 56/202 |

Primary Examiner—Louis G. Mancene
Assistant Examiner—J. N. Eskovitz
Attorney—Arthur J. Hansmann

[57] ABSTRACT

A grass catcher bag and mower assembly of a mower housing and a chute pivotally mounted on the housing and a grass catcher of the bag type mountable on the mower housing. The grass catcher has an extension for engaging the chute and pivoting the chute out of the way when the bag is being mounted onto the mower, and the mower and the grass catcher have mating portions which interengage for suspending the catcher on the mower.

7 Claims, 3 Drawing Figures

PATENTED DEC 18 1973 3,778,986

GRASS CATCHER BAG AND MOWER ASSEMBLY

This invention relates to a grass catcher bag and mower assembly, and the construction includes a pivoted grass deflector chute which extends laterally of the mower for deflecting the grass and for protecting the operator from the rotating cutter.

BACKGROUND OF THE INVENTION

Lawn mowers and grass catchers of the bag type are commonly known in the art. One prior art example of this construction is found in U. S. Pat. No. 3,112,597 where a rotary type lawn mower is shown to have a grass discharge outlet extending laterally and rearwardly of the mower housing, and a grass catcher bag mounts on the housing by having prongs or extensions which slide into openings or sockets on the mower housing. Further, the prior art is already aware of rotary lawn mowers which have pivoted covers or the like on the mower housing for pivoting downwardly over the opening through which the grass is discharged. That is, a prior art mower such as that seen in U. S. Pat. No. 3,132,457 has a pivoted cover which can be pivoted upwardly when the discharge outlet is to be opened and then the grass catcher bag can be mounted in flow communication with the open discharge area on the mower housing.

However, the prior art has not recognized the problem of properly guiding the clippings from the mower housing and at the same time protecting the operator from being cut by the rotating cutter, such as when the operator might place his hand or foot into the opening and into the path of the rotating cutter. Therefore, in the present invention, a pivoted deflector chute is provided on the mower housing to be in flow communication with the housing discharge opening and to thereby direct the clippings away from the mower housing and away from the operator standing behind the mower. Further, the present invention provides this pivoted chute so that the operator cannot accidentally place his hand or foot into the mower housing opening and be cut by the rotating blade. However, when the aforementioned problem of deflecting the grass and providing for operator safety is recognized and solved, such as in the manner mentioned, then there is a concern relative to the mounting and removal of a grass catcher bag such that the bag will be in flow communication with the housing discharge opening to receive the grass clippings.

Accordingly, it is a primary object of this invention to solve the problems of properly deflecting the grass, providing for operator safety, and providing for ready and easy mounting and removal of the grass catcher bag. These three objectives, and other additional objectives and advantages, are all accomplished with a mower and grass catcher assembly which is readily and easily manufactured and which is easily handled and manipulated by the operator for use of the mower with or without the grass catcher bag, as desired.

Additionally, when a mower is provided in the aforementioned manner so that it may be used either with or without a bag catcher, there is a concern for the ready and easy mounting and removal of the catcher relative to the mower housing. Therefore, it is an additional object of this invention to provide a mower and grass catcher assembly wherein the bag type of grass catcher can be readily and easily mounted and removed relative to the mower, and the operator's safety is a factor of uppermost concern in the provision of this type of assembly. That is, when the operator is attaching or removing the catcher, the present invention provides for safety to the operator in that the operator can stand clear of the mower, and, even though the mower may still be running, the operator is not endangered by the rotating blade but he can nevertheless be mounting the catcher and he could be removing the catcher while remaining in a safe position.

Other objects and advantages will become apparent upon reading the following description.

DETAILED DESCRIPTION OF THE PREFERRED EMBODIMENT

Figure 3:
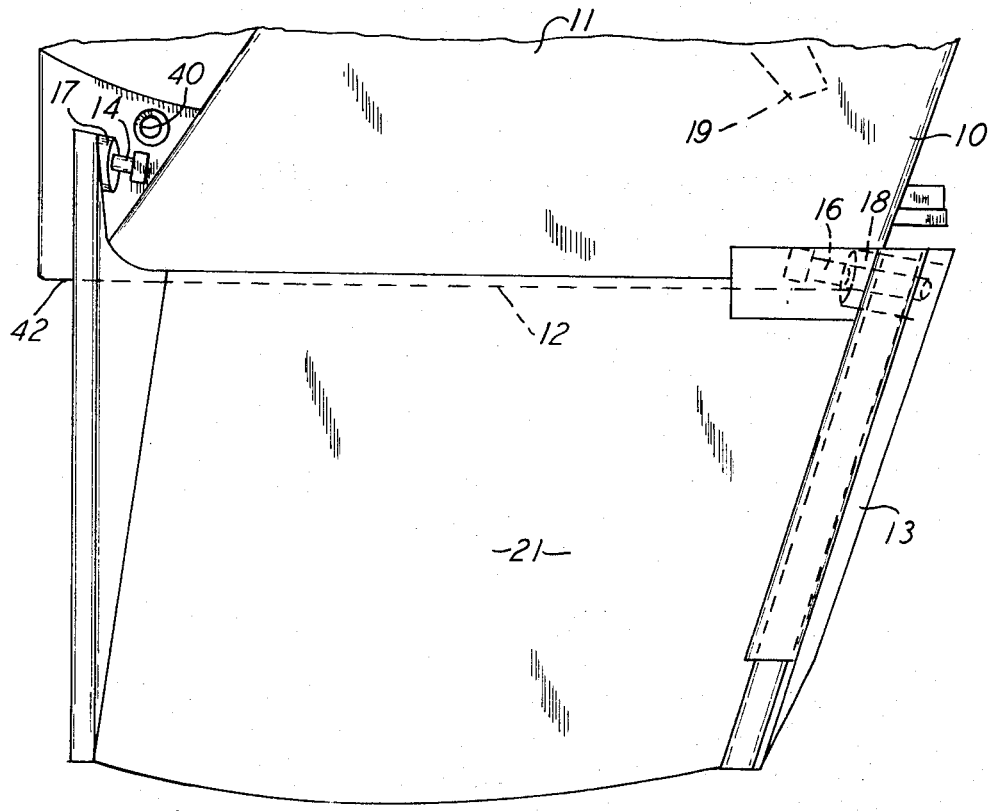
FIG. 3 is an enlarged plan view of the deflector chute shown in FIG. 1 and with a fragment of the mower added thereto.
Figure 2:
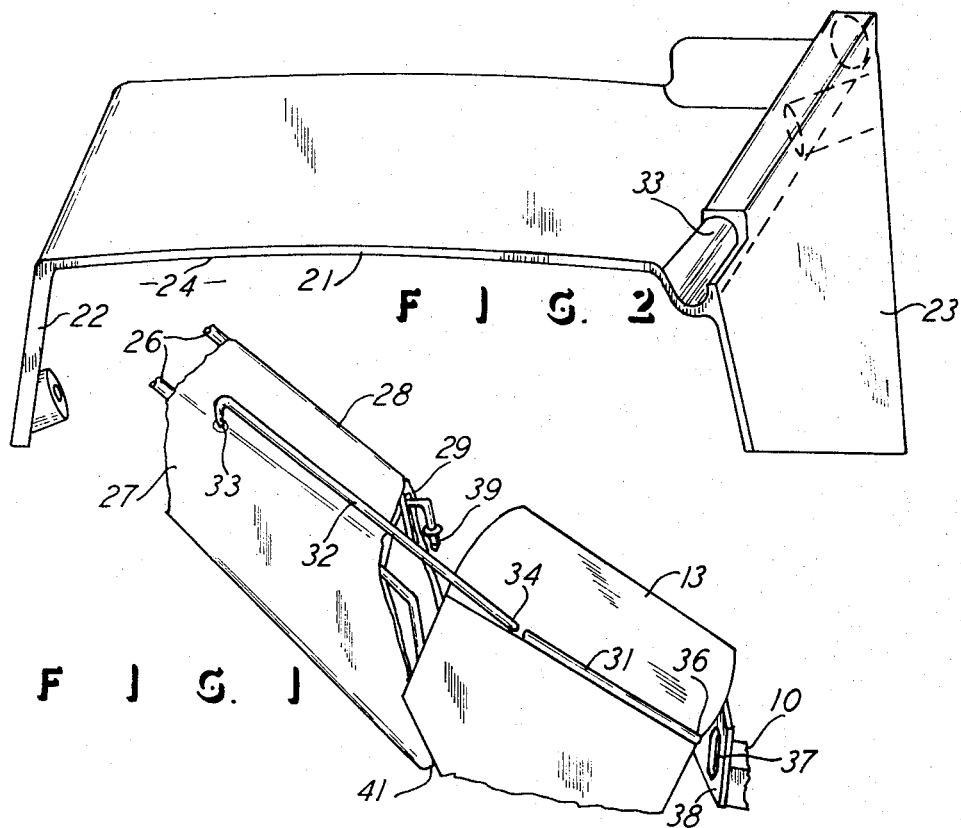
FIG. 2 is an enlarged front elevational view of the deflector chute shown in FIG. 1.

A conventional rotary type lawn mower has a mower housing 10 with its usual grass clipping outlet portion 11 extending laterally and rearwardly of the mower housing, relative to the operator's position and the fore-and-aft axis of the mower, and the outlet portion 11 terminates in an outlet opening at the terminal end 12 of the deflector portion 11. A grass clipping extension or deflector chute 13 is pivotally mounted on the mower housing 10 by means of the pivot pins 14 and 16 on the housing 10. Bosses 17 and 18 are on the chute 13 and have openings aligned on a common axis extending between the bosses 17 and 18 for receiving the respective pins 14 and 16 in the pivotal mounting of the chute 13 on the housing 10. Thus, it will be seen and understood by one skilled in the art that the mower is a conventional rotary type mower and it has the chute 13 pivoted on the side of the mower housing 10 for up-and-down pivot action of the chute 13. Therefore, when the chute 13 is in the downward position, as seen in FIGS. 2 and 3, then the chute 13 forms an extension to the mower chute portion 11, and the clippings are directed laterally of the mower and away from the operator standing behind the mower. Further, when the chute 13 is in the downward position, the operator is protected against accidental placement of a hand or a foot into the path of the mower's rotating cutting blade, such as the blade 19 which rotates past the discharge opening in the mower housing 10.

The chute 13 has a top wall 21 and upright side walls 22 and 23, and these three walls define the outlet opening 24 which is aligned with and an extension of the outlet opening for the mower housing 10.

Figure 1:
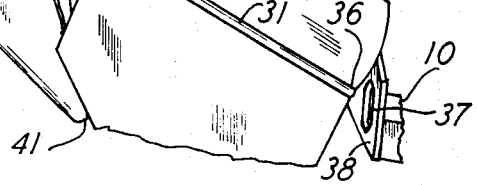
FIG. 1 is a perspective view of a fragment of a grass catcher bag and mower assembly showing a preferred embodiment of this invention.

FIG. 1 shows a fragment of a grass catcher of the bag type and having a hardware or frame portion 26 on which a bag 27 is draped and supported. Of course, it is common practice to mount the grass catcher bag, which is generally designated 28, onto the mower housing 10 for receiving the clippings coming through the mower discharge opening. That is, the grass catcher forward portion designated 29 is commonly disposed in the position adjacent the mower outlet edge 12, so that the clippings flow continuously from the mower and directly into the grass catcher 28. Thus, FIG. 1 shows the grass catcher 28 in a slightly separated position, relative to its attached position on the mower. Of course, it will also be understood and seen that when the catcher 28 is not being used, then the deflector chute serves the purposes mentioned, but the deflector chute 13 is in the way when it is desired to mount the catcher 28 onto the mower housing 10. In order to negotiate the deflector chute 13 in the mounting of the catcher 28, the deflector 13 and the catcher 28 have inter-engaging portions, 31 and 32, respectively. The chute portion 31 is an opening or socket 33 which extends through the chute 13, and the catcher portion 32 is the extension, in the form of the rod shown and designated as 32. That is, the rod 32 is a rigid portion of the catcher hardware, and it is connected to the hardware or frame 26 at the location designated 33, such as by welding or the like, and the prong or extension 32 then extends forwardly of the remainder of the grass catcher 28. The extension 32 can be slidably positioned within the chute opening or socket 33, and such opening or socket 33 is therefore a sleeve in the chute 13 so that the tipping or manipulation of the catcher 28 will cause the upward pivoting of the chute 13 and thus move the chute 13 out of the way for mounting the catcher 28. In this process, the operator stands clear of the mower housing 10 and in fact the operator is gripping the rearward extension of the rods or frames 26 which are only fragmentarily shown, and he can adequately insert the rod 32 into the sleeve 33 and then pivot the chute 13 upwardly to move the chute 13 out of the way for the remainder of the process of attaching the catcher 28 to the mower housing 10.

When the rod 32 is fully seated or slipped into the sleeve 33, then the rod forward end 34 extends beyond the chute sleeve end 36, and the rod 34 can then be inserted into an uprightly oriented slot 37 on a piece 38 suitably supported on the mower housing 10. Further, when the extension 32 is fully inserted into the sleeve 33 as mentioned, then a second extension 39 rigid with the catcher framework 26 can be dropped into a hole or socket 40 on the mower 10. That is, insertion of the catcher extension end 34 into the slot 37 can be achieved at various angles of pivot of the chute 13, by virtue of the upright slot 37 and its upright dimension, and the entire catcher 28 can then be pivoted about the longitudinal axis of the extension 32 so that the extension 39 can be moved downwardly and into the hole 40. Of course, the catcher 28 is then in a cantilever or suspended position on the mower 10, and the catcher lower portion 41 will abut the side of the mower housing, such as the side 42, to secure the cantilever suspension mentioned.

With this arrangement, the chute 13 can be used without the catcher 28, but, when it is desired to attach the catcher 28, the operator can readily pivot the chute 13 out of the way, by means of the inter-engagement between the catcher 28 and the chute 13. Further, when the catcher extension 32 is fully inserted into the chute portion 31 and the chute 13 is pivoted upwardly by manipulation of the then assembled catcher 28 and chute 13, the mower housing mounting portion 37 and 40 are available to and are subsequently axially aligned with the extension 32 and extension 39 for mating engagement therebetween. Thus, the grass catcher 28 has the portions 32 and 39 releasably engageable with the mower portions 37 and 40, and the grass catcher portion 32 is engageable with the chute portion 31, and, the grass catcher one portion 32 is engageable with the chute portion 31 and the mower one portion 37.

What is claimed is:

1. A grass catcher bag and mower assembly comprising a mower housing having a grass-clipping outlet portion extending laterally of said mower housing, a chute pivotally mounted on said mower housing and extending laterally of said mower housing, to form an extension to said outlet portion in a lowered operating position and being pivotal upwardly to a raised inoperative position, a grass catcher of the bag type, said mower housing and said grass catcher respectively having inter-engageable portions, engaged with each other for removably mounting said grass catcher on said mower housing and with said portions on said mower housing being located to be exposed at the exterior of said mower housing and thereby accessible to said portions of said grass catcher when said chute is pivoted upwardly, and said grass catcher and said chute having inter-engageable portions releasably attached together for upward pivoting of said chute upon manipulations of said grass catcher.

2. The grass catcher bag and mower assembly as claimed in claim 1, wherein one portion of said grass catcher constitutes at least some of said portions of said grass catcher and is engaged with both said mower housing and said chute.

3. The grass catcher bag and mower assembly as claimed in claim 2, wherein said one portion is an extension on said grass catcher, and the portion of said chute which is engageable with said one portion of said grass catcher includes an opening in said chute for receiving said extension.

4. The grass catcher bag and mower assembly as claimed in claim 3, wherein said opening is sleeve-shaped for slidably receiving said extension and with said extension extending beyond said sleeve-shaped opening toward said mower housing, and said mower portions include an opening for receiving the end of said extension extending beyond said sleeve-shaped opening.

5. The grass catcher bag and mower assembly as claimed in claim 1, wherein said grass catcher includes an extending portion which constitutes at least some of said grass catcher portions, and said chute and said mower housing have openings which constitute at least some of said chute portions and said mower housing portions, said openings being arranged to receive said extending portion for attachment between said grass catcher and said chute for the upward pivoting of said chute and for the mounting of said grass catcher onto said mower housing.

6. The grass catcher bag and mower assembly as claimed in claim 5, wherein said opening in said chute is sleeve-shaped, and said opening in said mower housing is located to be on the longitudinal axis of the sleeve-shaped opening when said chute is pivoted upwardly.

7. The grass catcher bag and mower assembly as claimed in claim 5, including a second extending portion on said grass catcher, and said mower housing having a second opening for receiving said second extending portion in the mounting of said grass catcher onto said mower housing.

* * * * *